Sept. 16, 1958 C. D. FEDDE ET AL 2,852,622

SIGNAL-TO-NOISE SQUELCH CONTROL CIRCUIT

Filed Jan. 13, 1955 2 Sheets-Sheet 1

INVENTORS
CHRISTIAN D. FEDDE
JAMES L. WESTCOT
BY Merwin Moody
ATTORNEY

Sept. 16, 1958 C. D. FEDDE ET AL 2,852,622

SIGNAL-TO-NOISE SQUELCH CONTROL CIRCUIT

Filed Jan. 13, 1955 2 Sheets-Sheet 2

INVENTORS
CHRISTIAN D. FEDDE
JAMES L. WESTCOT
BY Marvin Moody
ATTORNEY

United States Patent Office 2,852,622

Patented Sept. 16, 1958

2,852,622

SIGNAL-TO-NOISE SQUELCH CONTROL CIRCUIT

Christian D. Fedde and James L. Westcot, Cedar Rapids, Iowa, assignors to Collins Radio Company, Cedar Rapids, Iowa, a corporation of Iowa Application January 13, 1955, Serial No. 481,648

13 Claims. (Cl. 179—171)

This invention relates generally to squelch control circuits and particularly to a squelch circuit that is controlled by the signal-to-noise ratio of an output signal from the detector in a radio receiver.

The most important factor in determining whether a received signal is intelligible is its signal-to-noise ratio. The intelligence in a signal can only be recovered if the signal-to-noise ratio exceeds a given amount, which depends upon the type of signal, such as continuous wave, voice, etc.

The term, signal-to-noise ratio, is defined herein by the formula:

$$R = \frac{S_i}{N_i} \qquad (1)$$

where R is the signal-to-noise ratio, $S_i$ is the energy of the information component of a detected signal, and $N_i$ is the energy of the noise component of the detected signal.

In the past, squelch circuits which were controlled by the signal-to-noise ratio of a received signal were extremely complex and relatively unreliable. For these and other reasons, squelch circuits that were dependent upon signal-to-noise ratio have not been generally used. Instead, a type of squelch circuit that is commonly used at present is the carrier-operated squelch, which depends upon the carrier amplitude of a received signal. The carrier-operated squelch has simplicity of construction but suffers from many practical liabilities.

The carrier-operated squelch system disables the audio output of a receiver when the detected carrier level falls below a predetermined level. Carrier amplitude is only indirectly related to the signal-to-noise ratio; however, carrier-controlled squelch systems operate on the theory that a given carrier level corresponds to a given signal-to-noise ratio. This assumption very often is not valid. For example, the gain in a multi-channel receiver may vary widely among the different channels. Therefore, channels having different gains but receiving signals with the same carrier strength at the antenna will detect different carrier amplitudes at the receiver detector to cause different responses with a carrier-operated squelch system, although the weaker detected signal may have a better signal-to-noise ratio. Consequently, the squelch sensitivity of the carrier-operated squelch system may vary widely in an arbitrary manner among different channels to squelch the various channels at widely differing and unrelated signal-to-noise ratios; and thus the audio output may remain cut off during small intelligible signals on some channels.

Proper operation of carrier-operated squelch circuits often requires a reduction in receiver sensitivity, since an unduly large gain on some channels may cause the squelch to enable the receiver output when only noise is received. Thus, carrier-operated squelch systems often require means for decreasing receiver sensitivity by reducing the gain on some channels.

A signal-to-noise squelch system, on the other hand, depends directly upon the signal-to-noise ratio of the signal and avoids dependency on the variables concerned in a carrier-operated squelch system, such as variation in antenna strength, noise-figure and gain among the different channels of the receiver. Accordingly, the signal-to-noise squelch system can provide both maximum squelch sensitivity and maximum receiver sensitivity on all channels regardless of variation among the channels in the gain, noise-figure or the amount of signal received from the antenna.

It is therefore an object of the invention to provide a squelch control circuit that permits a receiver to be operated at the maximum sensitivity level of each of its channels.

It is another object of this invention to provide a signal-to-noise squelch that is simple in construction and provides optimum reliability under widely varying operating conditions.

It is still another object of this invention to provide a signal-to-noise squelch control that maintains a predetermined sensitivity level that is relatively free of the drift commonly found in carrier-operated squelch systems.

It is a further object of this invention to provide a squelch control circuit that is capable of opening and closing the audio output of a receiver at a predetermined signal-to-noise ratio that may be either above, below, or at the threshold of intelligibility.

It is a still further object of this invention to provide a squelch circuit that may be set to operate at a constant predetermined signal-to-noise ratio as obtained at the output of the audio detector of a receiver.

It is yet another object of this invention to provide a squelch circuit with a rise-time that is sufficiently fast not to be detrimental to the intelligence.

It is still another object of this invention to provide a squelch circuit which will not open the audio output of a receiver when there is no received signal nor when there is a received carrier not carrying intelligence.

The invention provides a signal-to-noise ratio controlled squelch control circuit which has a pair of resonant circuits that are serially connected to each other across the output of an audio detector in a receiver. One of the resonant circuits is tuned with a bandpass over that portion of the lower audio range where most of the power exists in human speech. The bandpass varies slightly from voice to voice and between male and female voices but is generally between 100 and 900 cycles per second. The other resonant circuit is tuned to receive frequencies above about 5,000 cycles per second, where the human voice provides almost no power output but where noise is prominent, and preferably has a bandpass that falls between about 5,000 and 20,000 cycles per second.

Generally, an amplifier is situated between the output of the audio detector and the resonant circuits of the invention in order to isolate them and to match impedances. Each resonant circuit has connected across it, or at least across a portion of it, a capacitor and a diode that are serially connected. The diodes associated with the resonant circuits are connected with opposite polarity with respect to ground; and thus, they charge their respective capacitors with opposite polarity direct-voltages.

A potentiometer may be provided which has its opposite ends connected to the charged sides of the capacitors, and the composite output voltage provided by the squelch sensing circuit is obtained from the tap of the potentiometer. A particular setting of the tap substantially corresponds to a given signal-to-noise ratio of the detected signal.

The tap of the potentiometer is connected to a direct-current amplifier which actuates the audio output of the receiver and may operate a relay to disconnect the audio output of the receiver from the detector when the signal-to-noise ratio falls below a preset value. The relay may be provided with an extra set of contacts which connect a large capacitor between the potentiometer tap and ground to increase the decay-time of the squelch circuit.

Further objects, advantages, and features of the invention will be apparent to a person skilled in the art upon further study of this specification and drawings, in which.

Figure 1:
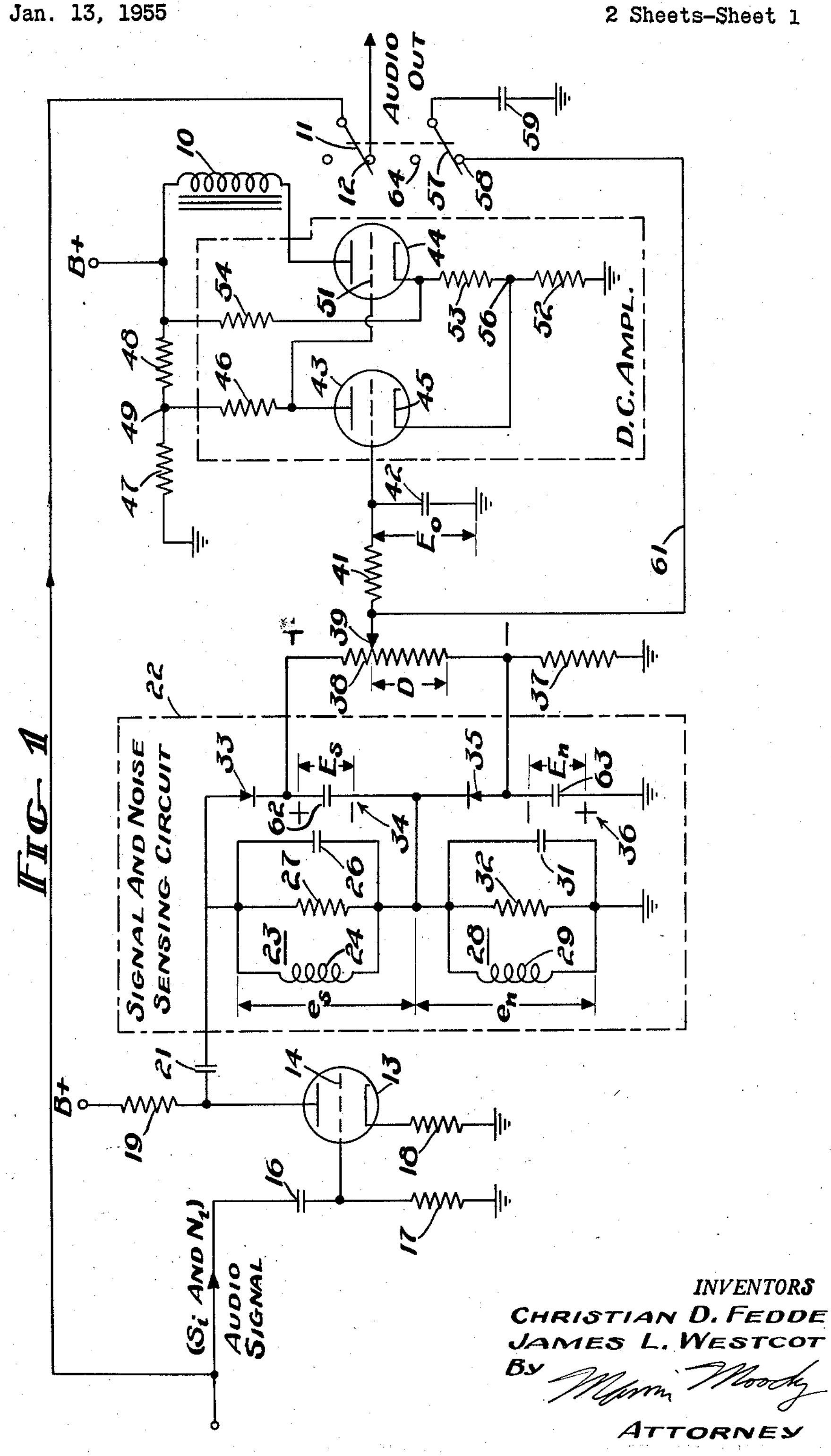
Figure 1 is a schematic diagram of the invention.

Figure 1 illustrates a form of the invention that is connected to actuate a relay 10 which has one set of contacts 11 and 12 that are in series with the audio output in a radio receiver. It is understood, however, that the invention may be used instead to disable the audio amplifier by actuating its control-grid bias below cutoff when the signal falls below the preset ratio. Thus the invention may be connected to an audio amplifier in almost any conventional manner.

The embodiment of Figure 1 utilizes an amplifier tube 13 which has its control grid 14 connected to the output of an audio detector (not shown) through a blocking condenser 16. Amplifier tube 13 is conventionally connected with a grid-leak resistor 17, a cathode biasing resistor 18 and a plate resistor 19, which is connected between the plate of tube 13 and a B plus power-source. The output of amplifier 13 is provided through a second blocking condenser 21, which has one end connected to the plate of tube 13.

The output of amplifier 13 is substantially linear throughout the audio frequency spectrum and thus contains the same noise and signal components that exists at the detector output.

The invention provides a signal and noise sensing circuit 22 which efficiently separates signal components from noise components of the detected signal. Signal components are sensed by a signal tank circuit 23 which consists of an inductance 24 and capacitor 26 connected in parallel. Tank circuit 23 has one of its ends connected to the output end of blocking capacitor 21. A resistor 27 is connected across tank circuit 23 to provide a desired bandwidth which generally will be between approximately 200 and 900 cycles per second as will be explained below in more detail. The center-frequency of tank circuit 23 is tuned between 400 and 600 cycles per second as will also be explained below in more detail.

A noise sensing tank circuit 28 is provided and is connected between ground and the other end of signal sensing tank circuit 23. Noise sensing tank circuit 28 is comprised of an inductance 29 and a capacitor 31 connected in parallel. A resistor 32 may be connected across them if it is necessary to increase the bandpass for noise sensing circuit 28. Noise sensing circuit 28 is tuned with a bandpass that is above that portion of the audio spectrum having virtually all audio speech power; and it may pass frequencies between 5,000 and 20,000 cycles per second.

Whether resistors are required across either tank circuit depends upon the resistance in the respective circuits. Thus, where the Q of the inductor is too high to provide the proper bandpass, additional resistance must be provided either in parallel or in series with the tank circuit to increase its bandpass to a required value.

The audio detector circuit (not shown) preceding signal and noise sensing circuit 22 must have a bandpass which includes, at least in part, the bandpasses of both tank circuits 23 and 28.

A diode 33 and a charging capacitor 34 are connected in series across signal sensing tank circuit 23. Similarly, another diode 35 and another capacitor 36 are connected in series across noise sensing tank circuit 28. Diodes 33 and 35 are connected with opposite polarity with respect to ground; and therefore, when arranged as shown in Figure 1, capacitor 36 will be charged with a negative voltage on its ungrounded side and the other capacitor 34 will be charged with a positive voltage on its ungrounded side. It will be noted in Figure 1 that the negative side of capacitor 34 is substantially grounded through inductance coil 29 of noise sensing circuit 28, since coil 29 has relatively low resistance.

A resistor 37 is connected across capacitor 36 to provide a discharge path for capacitor 36 and to provide a proper time constant. If too long a time constant is associated with capacitor 36, very short sporadic noise pulses will have an over-emphasized effect on the direct-voltage output of the noise sensing circuit.

A potentiometer 38, which has a large value of resistance, is connected at one end to the negatively charged side of capaictor 36 and is connected at the other end to the positively charged side of the other capacitor 34. Thus, potentiometer 38 will have a positive direct-voltage applied to one end, which is proportional to the output of signal sensing circuit 23, and will have a negative direct-voltage applied at its other end, which is proportional to the output of noise sensing circuit 28.

A capacitor 42 and a resistor 41 are connected in series between ground and the tap of potentiometer 38 to comprise a low-pass filter.

A pair of electron tubes 43 and 44 provide direct-current amplification for the direct voltage output received from tap 39. First tube 43 has its control grid connected to the ungrounded side of capacitor 42, and it has a plate resistor 46 connected at one end to the plate of tube 43. The other end of plate resistor 46 is connected to a constant source of direct-voltage, which has a lower value than the B plus voltage provided to second tube 44, and may be provided by a divider comprising resistors 47 and 48 connected between the B plus source and ground, wherein plate resistor 46 is connected to the intermediate point 49 of the divider.

Second tube 44 has its control grid 51 connected to the plate of first tube 43, and a pair of cathode resistors 52 and 53 are serially connected between the cathode of tube 44 and ground. Another resistor 54 is connected between the cathode of tube 44 and the B plus source to comprise a voltage divider with resistors 52 and 53. The cathode 45 of first tube 43 is connected to the point 56 on the voltage divider.

The audio control relay 10 is connected serially between the plate of second tube 44 and the B plus source.

Relay 10 is shown with double-pole, double-throw contacts; wherein pole 11 and contact 12 switch the audio output of the receiver (not shown), and the other pole 57 and contact 58 switch one end of a large capacitor 59, which has its other end connected to ground. Hence, relay 10 connects capacitor 59 to tap 39 by a lead 61 when the audio output is connected.

In this embodiment, poles 11 and 57 engage contacts 12 and 58 when relay 10 is de-energized. Thus, the audio output of the receiver is engaged when relay 10 is de-energized. Engagement during the de-energized condition of the relay is chosen because the drop-out time of a relay is generally faster than its pull-in time. Consequently, the audio output of the receiver can be connected faster by a drop-out actuation of the relay than it can by a pull-in actuation.

Figure 2:
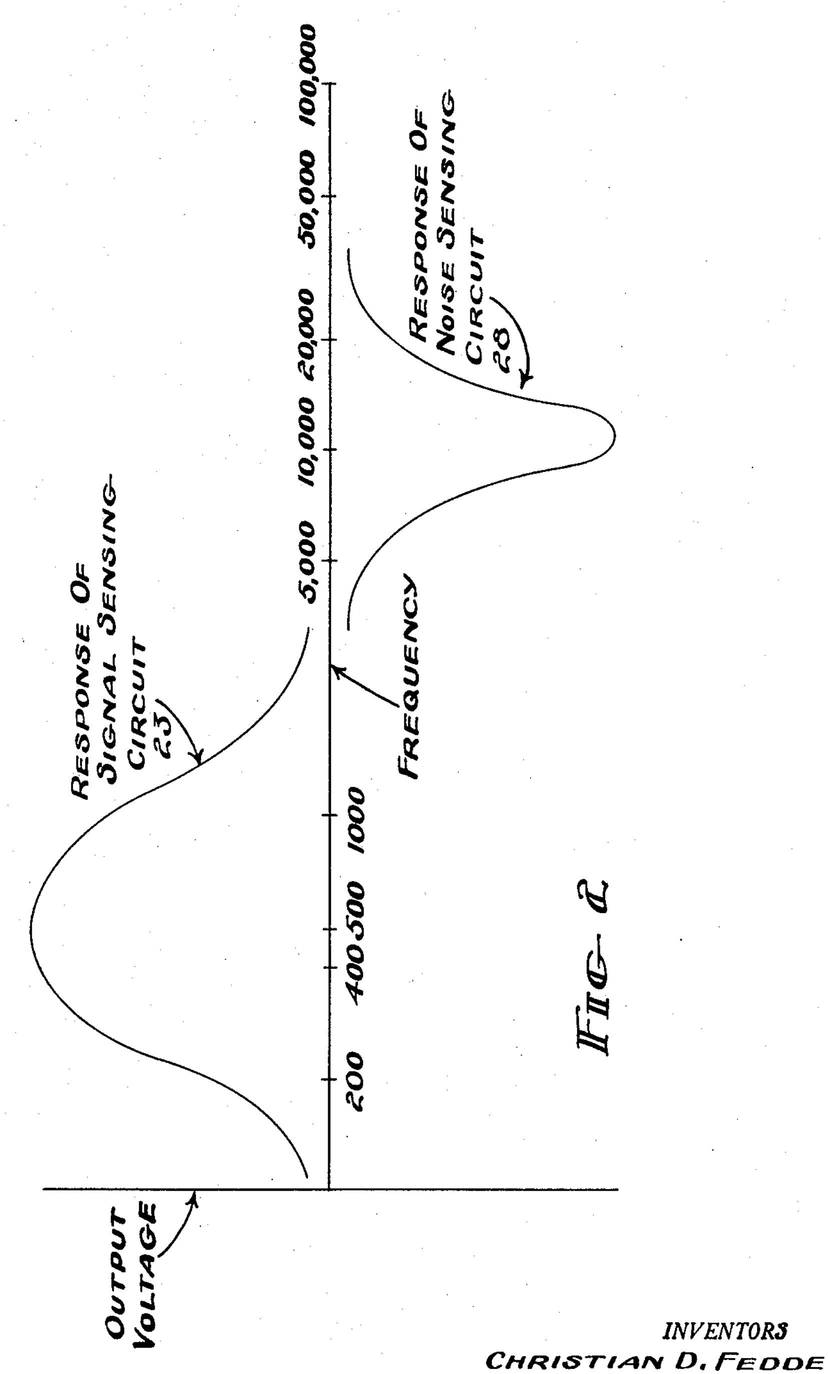
Figure 2 shows the frequency response of signal sensing and noise sensing tank circuits that may be used in the invention.

Figure 2 shows examples of the frequency response that may be obtained with signal tank circuit 23 and noise tank circuit 28.

The bandpass of signal sensing tank circuit 23 is preferably tailored to the particular class of voices that will be received, in order to provide the most efficient operation for this sensing circuit. The attenuation with frequency of the filter comprising signal sensing circuit 23 should vary in a manner than is inverse to the variation with frequency of the average power output of the particular class of human voices that are to be received. The average pitch for a woman's voice is about 256 cycles per second while the average pitch for a man's voice is about 130 cycles per second. It has been found, that more than one-third of the power provided by men's speaking voices lies in the frequency range between 250 and 500 cycles per second and that very little power output is provided by the human voice at frequencies above about 1000 cycles per second. Thus, it has been determined that an optimum bandpass for signal sensing circuit 23, that applies to almost all types of voices, is between about 250 cycles per second and 900 cycles per second which will pass most of the power components in speech but will exclude a maximum amount of noise power. Also, in regard to aircraft receivers, this bandpass will generally exclude lobe-modulation interference.

On the other hand, it has been found that noise exists over the whole audio frequency spectrum and generally is greatest in the frequency range from about 5,000 to 20,000 cycles per second. Thus, the optimum bandpass of noise sensing circuit 28 is either all or a portion of the frequency range between 5,000 to 20,000 cycles per second. This portion of the audio spectrum has been found to be relatively free of heterodynes or squeals, as they are sometimes called.

Therefore, the output of amplifier 13 will be divided frequencywise between the two series connected tank circuits to provide a voltage $e_s$ across signal sensing circuit 23 and a voltage $e_n$ across noise sensing circuit 28.

Because of the bandpass of signal sensing tank circuit 23, alternating voltage $e_s$ will be due primarily to the signal components received from the audio detector and secondarily to noise components within its bandpass and may be defined mathematically by the formula:

$$e_s = S_s + N_s \qquad (2)$$

where $S_s$ represents the voltage component of $e_s$ due to signal, and $N_s$ represents the voltage component of $e_s$ due to noise within the bandpass of signal sensing circuit 23. An optimum bandpass choice for signal sensing circuit 23 based on the power-frequency distribution of the human voice maximizes signal power and minimizes noise power to provide maximum efficiency for signal sensing tank circuit 23. Voltage $S_s$ will then be much greater than voltage $N_s$.

The alternating voltage $e_n$ across noise sensing circuit 28 may be defined mathematically by the formula:

$$e_n = S_n + N_n \qquad (3)$$

where $S_n$ represents the voltage component of $e_n$ due to signal, and $N_n$ represents the voltage component of $e_n$ due to noise within the bandpass of noise tank circuit 28. Since the bandpass region of noise circuit 28 was chosen where there is much noise and virtually no signal, voltage $N_n$ will be very much greater than signal voltage $S_n$; and consequently, noise circuit 28 has very high efficiency. Therefore, voltage $S_n$ may be neglected without causing essentially any error.

The ratio of signal-to-noise is approximately defined by the formula:

$$R \cong \frac{e_s}{e_n} \qquad (4)$$

where R is the signal-to-noise ratio. Although voltage $e_s$ will have a noise component, it will be relatively small when tank circuit 23 is provided with a bandpass as defined above; and the voltage ratio in Formula 4 is directly related to the signal-to-noise ratio of the detected signal.

Diode 33 rectifies voltage $e_s$ and charges capacitor 34 with a direct voltage $E_s$ that is proportional to the peak values of alternating voltage $e_s$, because of the large time constant, which may be 0.02 second, provided by capacitor 34 and potentiometer 38. Plate 62 of capacitor 34 is charged with a positive voltage because of the polarity of diode 33.

Similarly, the other capacitor 36 will have its plate 63 charged to a negative direct voltage $E_n$, due to the polarity of diode 35, which will be proportional to the peaks of alternating voltage $e_n$. Because of the higher frequencies associated with capacitor 36 and the varied nature of noise pulses, capacitor 36 has a shorter time constant associated with it than the other capacitor 34 and may have a time constant of about 400 microseconds.

Potentiometer 38 will have the positive signal sensing voltage $E_s$ applied at one end and will have the negative noise sensing voltage $E_n$ applied at the other end. Tap 39 will therefore provide a direct-voltage output designated herein as $E_o$ that will depend upon the outputs of the tank circuits and upon the setting of tap 39, which will be designated herein as D. Setting D is defined as the ratio of the resistance of the portion of potentiometer 38 from its negative end to tap 39 divided by the total resistance of the potentiometer.

The signal-to-noise ratio provided by the invention may be defined in terms of the following equation:

$$R = \frac{\frac{E_o}{DAN_i} + \left(\frac{1}{D} - 1\right)(F_{S_n}R + F_{N_n}) - F_{N_s}}{F_{S_s}} \qquad (5)$$

where R is the signal-to-noise ratio, $F_{S_n}$ is the fraction of the signal output of the receiver detector that is passed by noise filter circuit 28, $F_{N_n}$ is the fraction of the noise output of the receiver detector that is passed by noise filter circuit 28, $F_{N_s}$ is the fraction of the noise output of the receiver detector that is passed by signal filter circuit 23, $F_{S_s}$ is the fraction of the signal output of the receiver detector that is passed by signal filter circuit 23, A is the amplification factor of amplifier 13, and elements $E_o$, D and $N_i$ are as defined above.

Since very littel signal is filtered by noise tank circuit 23, fraction $F_{S_n}$ is approximately zero, and hence the term $F_{S_n}R$ is approximately zero and may be neglected without substantial error. Also, tap 39 may be set to a point where output voltage $E_o$ is zero. With these conditions, Equation 5 can be reduced to the following equation:

$$R = \frac{\left(\frac{1}{D} - 1\right)F_{N_n} - F_{N_s}}{F_{S_s}} \qquad (6)$$

Since the terms $F_{N_n}$, $F_{N_s}$, and $F_{S_s}$ are fixed by choice of particular values in the tank circuits, the null voltage for each setting D of tap 39 will correspond to a different signal-to-noise ratio. While superficially it may appear that the output at tap 39 is only a measure of voltage difference, this is not the case. Thus, a particular voltage difference or null indicates a given ratio situation. By way of analogy, a bridge circuit is a particular form of circuit in which a null or fixed voltage difference situation is used to obtain a "ratio" situation. As a result of the zero (null) or fixed voltage difference situation obtained by the setting of potentiometer 39, the invention determines when a given signal-to-noise ratio is obtained. Equation 6 therefore proves that the signal-to-noise ratio is only dependent upon the setting of the potentiometer tap point, which determines D.

Thus, if the direct-current amplifier is adjusted to actuate relay 10 when its input voltage $E_o$ is zero, then the engagement of the relay contacts will occur at the particular signal-to-noise ratio which corresponds to the setting D.

However, if the direct-current amplifier is actuated by a constant value of input voltage other than zero, the actuation of the direct-current amplifier will still maintain an approximately fixed relationship to a particular signal-to-noise ratio, as determined by a setting of tap 39, which in this case will be positioned from the zero threshold value of voltage $E_o$ by the actuating voltage of the direct-current amplifier.

In the direct-current amplifier, the cathode of first tube 43 is maintained at a lower voltage than the cathode of second tube 44 due to the connection of cathode 45 to the intermediate point 56 of cathode resistors 52 and 53. In this manner, cathode 45 may be biased to a positive voltage with respect to ground so that the grid of first tube 43 is actuated above cutoff when voltage $E_o$ reaches zero volts, or a constant voltage near zero volts. Thus, the actuating voltage of the direct-current amplifier can be adjusted by varying the values of resistors 52, 53, and 54 in the voltage divider that they compromise.

The grid voltage of second tube 44 is determined by the plate voltage of first tube 43; and therefore drops in value when first tube 43 conducts. Consequently, second tube 44 conducts when first tube 43 is cut off and vice versa; and relay 10 is energized when first tube 43 is cut off and is de-energized when first tube 43 is conducting.

Since negative noise voltage $E_n$ predominates when the signal-to-noise ratio is below a predetermined value fixed by the setting of tap 39, the voltage at tap 39 will then be negative and relay 10 will be energized to maintain the audio output of the receiver disabled. However, when the signal-to-noise ratio exceeds the predetermined setting, the positive signal voltage predomiantes and the voltage at tap 39 becomes positive to de-energize relay 10 which enables the audio output.

There will be a delay between the instant that the signal rises above the selected signal-to-noise ratio and the instant that the audio output is connected by the relay. This delay period is termed "rise-time" herein and will be a function of the time constants provided by the charging capacitors, their associate resistors, the low-pass filter comprising resistor 41 and capacitor 42, and the drop-out time of relay 10. The rise-time is minimized by using the drop out-characteristic of the relay to connect the audio output. It has been found in practice that the total rise-time is only a few milliseconds, which will clip off only a small portion of the first part of the first word received.

The decay-time in the invention, which is the delay between the termination of a received signal and the disconnection of the audio output, is required to be long to prevent disconnections between words. The decay-time will be greater due to the longer pull-in time of the relay; but, unless special means are taken, the relay may still open and close its contacts between pauses in speech or break between words. This condition is remedied by capacitor 59, which is connected in the circuit at the same time that the audio output is connected and acts with the potentiometer resistance and resistor 41 to provide a very large time constant. This time constant greatly increases the decay-time and prevents the relay from being disengaged during pauses in speech or breaks between words.

A further expedient for obtaining decay-time may be provided by connecting relay contact 64 to a source of positive voltage; so that when capacitor 59 is switched into the circuit, it will carry a positive charge which discharges over a relatively long period of time to block the direct-current amplifier open and thereby, maintain the audio output connected for at least the period of discharge, which might be, for example, three seconds. The initial positive charge also prevents capacitor 59 from momentarily de-energizing the relay due to the loading action of capacitor 59 on the potentiometer output when initially connected.

Therefore, the squelch circuit of the invention provides a very short-rise-time and a very long decay-time.

It is therefore apparent that this invention provides a squelch control circuit that depends upon the signal-to-noise ratio of a detected signal and, therefore, permits a receiver to maintain maximum sensitivity on all channels. The components used to construct a circuit according to this invention are relatively common and easily obtained; and the operation of the circuit has been found to be reliable. Furthermore, it is relatively free of the drift that commonly occurs with carrier-operated squelch systems. The invention is capable of opening on a signal-to-noise ratio that is below the threshold of intelligibility. It also provides a squelch rise-time that is sufficiently fast not to be detrimental to intelligence. The invention will maintain its calibration at the preset signal-to-noise ratio regardless of variation in the input signal or noise levels.

While there has been described what is at present believed to be the preferred embodiment of this invention, it will be observed by those skilled in the art that variations, changes, and modifications may be made therein without departing from the invention, and it is therefore aimed in the appended claims to cover such changes and modifications as fall within the true spirit and scope of the invention.

What is claimed is:

1. Squelch control means for passing an audio signal when a predetermined signal-to-noise ratio is exceeded by the signal, and comprising, amplifier means having a substantially linear response over the audio frequency spectrum and with its input receiving said signal, a first parallel resonant circuit having a center frequency between 250 and 600 cycles per second, a second parallel resonant circuit having a bandpass that falls somewhere within the intermediate to upper portion of the audio spectrum, a blocking condenser with one side connected to the output of the amplifier means, the first and second resonant circuits connected in series between the other side of the blocking capacitor and ground, a first diode and a first capacitor connected serially only across the first parallel resonant circuit, a second diode and a second capacitor connected serially only across the second parallel resonant circuit, said diodes arranged to charge the first capacitor with a positive voltage and the second capacitor with a negative voltage with respect to ground, a potentiometer with one end connected to the positively charged side of the first capacitor and with its other end connected to the negatively charged side of the second capacitor, a resistor and a third capacitor connected serially between the tap of the potentiometer and ground to comprise a low-pass filter, direct-voltage amplifier means having a first electron tube with its grid connected to the ungrounded side of the capacitor in the low-pass filter, a second electron tube of said direct-voltage amplifier means with its grid connected to the plate of the first tube, a group of resistors connected serially between ground and the B plus supply voltage, an intermediate point of said group of resistors connected to the cathode of the first tube, the cathode of the second tube connected to a higher potential intermediate point of said group of resistors, a relay connected between the plate of the second tube and a B plus source and having at least double-pole double-throw contacts, a second positive voltage source having a smaller voltage than the B plus source, a plate resistor connected between the plate of said first tube and the second positive voltage source, one contact of said relay receiving said signal and providing the output of said circuit when engaged, a capacitor having a large value connected between ground and another of said relay contacts which engages another contact that is connected to the potentiometer tap, and both pairs of contacts engaged when the relay is de-energized and disengaged when the relay is energized, whereby the relay acts in response to the voltage provided by the tap and acts at the signal-to-noise ratio of the signal corresponding to the tap setting.

2. Squelch control means for passing an audio signal when a predetermined signal-to-noise ratio of the signal is exceeded, and comprising, amplifier means having a response over the audio spectrum, a first parallel resonant circuit having a bandpass in the lower region of the audio spectrum, a second parallel resonant circuit having a bandpass in the intermediate to upper regions of the audio spectrum, the first and second resonant circuits connected in series across the output of the amplifier means, a first diode and a first capacitor connected serially across the first parallel resonant circuit, a second diode and a second capacitor connected serially across the second parallel resonant circuit, said diodes arranged to charge their respective capacitors with opposite polarity direct-voltages, a potentiometer with one end connected to the positively charged side of one capacitor and with the other end connected to the negatively charged side of the other capacitor, a low-pass filter comprising a resistor and a capacitor connected serially between the variable tap of the potentiometer and ground, a first electron tube with its grid connected to the ungrounded side of the capacitor in the low-pass filter, a second electron tube with its grid directly connected to the plate of the first tube, said first and second tubes connected to form a direct-current amplifier, a relay connected between the plate of the second tube and a B plus source and having at least one set of contacts, one set of contacts of said relay passing said signal when closed, whereby a setting of the potentiometer tap selects a signal-to-noise ratio that actuates the relay to connect and disconnect the audio amplifier to the signal.

3. A squelch circuit which interrupts the passage of an audio signal when the quality of the signal drops below a given signal-to-noise ratio, the circuit comprising, amplifier means connected to the detector output and having an output response over the audio frequency spectrum, a first tank circuit and a second tank circuit connected in series across the output of the amplifier means, a first diode and a first charging capacitor connected in series only across the first tank circuit, a second diode and a second charging capacitor connected in series only across the second tank circuit, first resistance means connected in the first tank circuit to obtain a bandpass over the range from about 250 cycles per second to about 900 cycles per second, second resistance means connected in the second tank circuit to obtain a bandpass that falls between about 5,000 and 20,000 cycles per second, the first and second diodes connected with opposite polarity with respect to ground to charge the charging capacitors with direct voltages having opposite polarity, control resistance means connected at its ends respectively to the oppositely charged sides of the charging capacitors, a tap of said control resistance means located at an intermediate point to provide a threshold control voltage corresponding to a given signal-to-noise ratio of said signal, direct-current amplifiers means with its input connected to said tap, and switching means actuated by the output of the direct-current amplifier, said switching means passing said signal and interrupting it when actuated, whereby said threshold control voltage actuates the switching means according to a specific signal-to-noise ratio corresponding to the setting of said tap.

4. A squelch control circuit dependent on the signal-to-noise ratio of a received audio signal, and comprising, amplifier means having response throughout the audio spectrum, a blocking capacitor connected on one side to the output of the amplifier means, first and second tank circuits connected in series between ground and the other side of the blocking capacitor, the first tank circuit having a bandpass including at least a part of the frequency range between 100 and 600 cycles per second, a first diode and a first charging capacitor connected serially across the first tank circuit, a second tank circuit having a center frequency in the intermediate to upper portion of the audio frequency range, a second diode and a second charging capacitor connected serially across the second tank circuit, the diodes arranged to charge the respective charging capacitors with opposite polarity direct voltages with respect to ground, resistance means having a large amount of resistance connected at one end to the high voltage side of said first charging capacitor and connected at the other end to the high voltage side of the second charging capacitor, a tap provided at an intermediate point on the resistance means, and position of the tap point controlling the threshold signal-to-noise ratio for the squelch control circuit.

5. A squelch control circuit dependent on the signal-to-noise ratio of a received signal having an intelligence component provided by the human voice, and comprising, a first tank circuit tuned to a frequency in the lower portion of the audio frequency range, a second tank circuit tuned to a frequency in the upper portion of the audio frequency range, said signal having a bandpass that includes frequencies within the bandpasses of both of said tank circuits, said first and second tank circuits connected in series with the received signal, a first diode and a first capacitor connected in series across the first tank circuit, a second diode and a second capacitor connected in series across the second tank circuit, the first and second diodes connected with opposite polarity with respect to the signal source, and a resistor connected at its opposite ends to the oppositely charged first and second capacitors, whereby an output voltage tapped from an intermediate point on said resistor controls the threshold signal-to-noise ratio provided by the circuit.

6. A squelch control circuit operated by the signal-to-noise ratio of a detected signal comprising, a first tank circuit having a bandpass including at least a part of the frequency range from 100 to 600 cycles per second, a second tank circuit having a bandpass including a part of the range from 5,000 to 20,000 cycles per second, said first and second tank circuits connected in series with said signal, said signal passing frequencies within the bandpass of both of said tank circuits, a diode and a capacitor connected serially across each of said respective tank circuits, said diodes arranged with opposite polarities with respect to ground to charge said capacitors with direct voltages of opposite polarity, and a potentiometer having very large resistance with its ends connected respectively to the oppositely charged sides of said capacitors, wherein the tap setting of said potentiometer controls the threshold signal-to-noise ratio setting of said squelch control circuit, and means connected to said tap to squelch the signal when the voltage at said tap exceeds a given value which corresponds to a null at a given point on said potentiometer.

7. A circuit for separating intelligence and noise components of a received audio signal wherein the intelligence components are produced by human speech, and comprising, amplifier means having response over the audio spectrum, with its input receiving said signal, a first resonant circuit having a center frequency between 100 and 600 cycles per second, a second resonant circuit having a center freqeuncy in a higher portion of the audio spectrum, said first and second resonant circuits connected across the output of said amplifier means, wherein the first resonant circuit selects primarily intelligence components of the received signal and the second resonant circuit selects primarily noise components of the received signal, first and second detection means connected respectively across said first and second resonant circuits to provide opposite-polarity detected voltages, resistive means connected between the opposite-polarity detected voltages, and a given point on said resistive means utilized to sense a given signal-to-noise ratio for said audio intelligence by its null indication.

8. A circuit for providing a direct voltage output primarily proportional to the ratio of the intelligence components to the noise components of an audio signal wherein the intelligence components of the signal are produced by human speech, said circuit comprising, a first parallel resonant circuit having inductance and capacitance and turned with a bandpass below about 3,000 cycles per second, a second parallel resonant circuit having inductance and capacitance and tuned with a bandpass above about 5,000 cycles per second, said first and second resonant circuits having their outputs connected in series, means for receiving said signal and passing frequencies within the bandpasses of said first and second resonant circuits and connected to said circuits, a first diode and a first capacitor connected in series across the first resonant circuit, a second diode and a second capacitor connected in series across the second resonant circuit, said first and second capacitors being charged to opposite-polarity voltages, resistance means connected between said first and second capacitors to divide the voltage between said charged capacitors, and a null point on said resistance means corresponding to a given signal-to-noise ratio of said intelligence components, whereby the direct voltage charging the first capacitor is approximately proportional to the intelligence components in the signal and the direct voltage charging the second capacitor is proportional to the noise components in the signal.

9. A circuit for signifying when a given signal-to-noise ratio of an audio signal is exceeded wherein the intelligence components are produced by human speech, and said circuit comprising, amplifier means having a response over the frequency range of the audio signal and with its input receiving said signal, a first parallel resonant circuit with a center frequency between 400 and 550 cycles per second and having a bandpass including the range of approximately 250 to 900 cycles per second, a second parallel resonant circuit having a bandpass in a portion of the spectrum between approximately 9,000 and 20,000 cycles per second, said first and second parallel resonant circuits connected to the output of said amplifier means, means for detecting with opposite polarities the outputs of said first and second resonant circuits, and resistive means connecting the opposite-polarity detected outputs, with the null voltage at a particular point on said resistive means signifying said given signal-to-noise ratio, and means responsive to the null voltage at said given point.

10. A circuit for signifying when a given signal-to-noise ratio of a received signal is exceeded, wherein the intelligence components are produced by human speech, said circuit comprising, a first parallel resonant circuit having an inductor, a capacitor and a resistor, said first resonant circuit tuned with a center frequency between 400 and 550 cycles per second and its resistance adjusted to provide a bandpass including the range of approximately 250 to 900 cycles per second, a second parallel resonant circuit having an inductor, a capacitor and a resistor, said second resonant circuit tuned with a center frequency between 9,000 and 20,000 cycles per second and its resistance adjusted to provide a bandpass of a portion of the spectrum between 5,000 and 20,000 cycles per second, said first and second parallel resonant circuits connected in series with the received signal, whereby the alternating voltage components appearing across the first and second resonant circuits are approximately proportional to signal components and the noise components, respectively, of said signal, means for detecting with opposite polarities the respective outputs of said resonant circuits, and resistive means connecting the opposite-polarity detected outputs, with the voltage at a particular point on said resistive means signifying said given signal-to-noise ratio by a null voltage at said point, and means responsive to said voltage at said tap point.

11. A circuit for signifying a chosen signal-to-noise ratio of a received information-bearing signal where its information component has a power distribution which lies predominantly in a particular portion of the frequency spectrum, said circuit comprising a first resonant circuit with a bandpass over said particular portion of the spectrum of the received signal where the information component has a predominant power distribution, a second resonant circuit with a bandpass over another portion of the spectrum of the received signal where the power of the noise components always predominates over the information components, said first and second resonant circuits connected in tandem with said received signal, wherein the alternating-voltage across said first resonant circuit includes said information component of the received signal and the alternating-voltage across the second resonant circuit is approximately proportional to the noise components in the received signal, opposite-polarity detection means for detecting the respective outputs of said first and second tank circuits, resistive means connected between the opposite polarity outputs of said detection means, with the null voltage at a given point on said resistive means signifying when said signal has reached said chosen signal-to-noise ratio, and means responsive to said null voltage to signify when said ratio is reached.

12. A circuit for indicating a chosen signal-to-noise ratio of an audio signal, comprising a first tank circuit with an attenuation-frequency variation that is approximately inversely proportional to the power-frequency variation of the human voice, a second tank circuit with a bandpass that substantially excludes the bandpass of said first tank circuit, said first and second tank circuits receiving said signal, and said signal having a bandwidth that includes at least part of the bandwidths of said first and second tank circuits, opposite-polarity detection and charging means for detecting and storing the respective outputs of said first and second tank circuits, resistive means connected between the opposite-polarity outputs of said detection and charging means, with a given point on said resistive means providing a null voltage to indicate when said signal has said chosen signal-to-noise ratio.

13. A circuit for determining when a received information bearing signal exceeds a given signal-to-noise ratio comprising, first resonant means having a bandpass including at least a part of said information-bearing signal, a second resonant means having a bandpass that substantially excludes the bandpass of said first resonant means, said first and second resonant means being connected to receive said signal, opposite-polarity detection means for detecting the respective outputs of said first and second resonant means, first and second charging means for respectively receiving the detected outputs of said opposite-polarity detection means, resistive means connected between said first and second charging means for dividing their opposite-polarity voltages, a chosen point on said resistive means indicating a null voltage when said received signal has said given signal-to-noise ratio, and voltage-responsive means connected to said resistive means to indicate when the voltage at said point exceeds said null in a given polarity.

References Cited in the file of this patent

UNITED STATES PATENTS

| | | |
|---|---|---|
| 1,808,915 | Bjoernson | June 9, 1931 |
| 2,098,286 | Garfield | Nov. 9, 1937 |
| 2,237,457 | Tellegen | Apr. 8, 1941 |
| 2,319,306 | Dickieson | May 18, 1943 |
| 2,379,799 | Haigis | June 3, 1945 |
| 2,409,139 | Magnuski | Oct. 8, 1946 |
| 2,459,675 | Noble | Jan. 18, 1949 |
| 2,537,998 | Henquet et al. | Jan. 16, 1951 |
| 2,588,031 | O'Brien et al. | Mar. 4, 1952 |
| 2,694,142 | Laidig | Nov. 9, 1954 |